April 24, 1956     CARL-ERIK GRANQVIST     2,743,441

ANTENNA SYSTEM

Filed Jan. 5, 1953     2 Sheets-Sheet 1

April 24, 1956     CARL-ERIK GRANQVIST     2,743,441
ANTENNA SYSTEM

Filed Jan. 5, 1953     2 Sheets—Sheet 2

INVENTOR.
CARL-ERIK GRANQVIST
BY
ATTORNEY

United States Patent Office 2,743,441
Patented Apr. 24, 1956

2,743,441

ANTENNA SYSTEM

Carl-Erik Granqvist, Lidingo, Sweden, assignor to Hazeltine Research, Inc., Chicago, Ill., a corporation of Illinois Application January 5, 1953, Serial No. 329,523

Claims priority, application Sweden March 1, 1952

8 Claims. (Cl. 343—815)

General

So-called speaking or talking radio beacons have great possibilities which make them attractive for use in direction indicating radio beacons, especially for air traffic. The advantages are, amongst others, that one may by a cheap and simple receiver on the airplane obtain advice about the bearing to the place where the radio beacon is situated, as well as that good precision will be obtained. Further, no complicated handling of the receiver is required from the personnel on the approaching airplane. The range of a normal speaking radio beacon is in usual flying altitudes 150 to 200 kilometers, and the bearing accuracy has been measured during advantageous conditions to be 2 to 5 degrees.

There are no especially high demands on the type of surrounding about the beacon because it is rather unimportant, if reflection from the surrounding should take place, since the lobe of the antenna directional characteristic of the radio transmitter, directed on to the receiver, is very narrow, and will therefore be influenced by adjacent topographical formations to a rather small extent.

These speaking radio beacons have been provided with a directional antenna, of which one has required that it should provide one or more sharply directed directional lobes limited within a narrow radiation angle. Now it may of course occur that topographical formations, buildings or other objects in the surroundings of the transmitter may catch the wave transmitted from such an antenna in an angular position of the transmission characteristic when this wave is not directed onto the receiver, and may retransmit this "false" signal to the receiver by reflection, in which it may cause misunderstandings or an erroneous bearing statement. To prevent this, one has also proposed to transmit, on the same frequency as that one by means of which the bearing indication is transmitted, a covering field modulated by means of an audio frequency oscillation, said field being transmitted in all of the directions in which the lobes of the bearing indicating field are not directed.

The transmission of this covering field will be especially important, if one provides two directional antennas, transmitting different bearing statements in mutually different directions, said antennas being mutually screened or shielded, for instance so that the one directional antenna is transmitting the bearing in one given direction simultaneously as the second directional antenna is transmitting a statement about the bearing in a direction corresponding to the contra bearing. It may for instance be assumed that the two antennas are fed by oscillations, composed by a common basic oscillation or carrier wave, on which bearing statements about every twentieth degree, by which the antenna system is rotating, have been modulated. When the one directional antenna is directed in the 200° compass direction, so that, in other words, the bearing from an airplane in the transmitter direction of the antenna onto said antenna will be 20°, this antenna is transmitting a carrier wave with a modulation of the word "two" but simultaneously the other antenna, set in the opposite direction, will transmit the carrier wave with a modulated bearing statement of "twenty," corresponding to 20° and 200° bearing, respectively. One moment later, after all of the antenna system has rotated a further step of 20°, the first mentioned antenna will transmit the bearing indication "four" simultaneously with the last mentioned antenna transmitting the bearing statement "twenty-two" and so on.

The present invention refers to an antenna system, by means of which it is possible to satisfy all of the demands, which should be satisfied by such a directional antenna. According to the invention the antenna system as a whole is composed of dipole antennas, two sets of dipole antennas being positioned at substantially the same horizontal level and being provided to transmit a field, limited to a very small angle in the horizontal plane, said two sets of dipole antennas being separated by a grounded insulation network. A third set of dipole antennas is positioned immediately adjacent to the two first mentioned ones and is provided to rotate together with these. The third set of dipole antennas could suitably be positioned immediately above the construction formed by the two first mentioned sets. It is arranged in such a way that the field transmitted from said last mentioned antenna will obtain a figure-eight-like characteristic with rather broad lobes, so applied in relation to the narrow lobes of the two first mentioned antennas, that the four lobes substantially fill out a full turn in the horizontal plane, and possibly overlap each other to a small extent.

It is an object of the invention, therefore, to provide a new and improved antenna system for a talking radio beacon which affords improved performance.

In accordance with the invention, an antenna system for a talking radio beacon having a mean operating wave length comprises a directive antenna array having a radiation pattern in the form of a pair of sharply concentrated beams extending in opposite directions and having a common axis, including a first plurality of dipole radiators having a length substantially equal to the aforesaid wave length and supported in spaced relation in a first plane, a second plurality of dipole radiators having the aforesaid length and supported in spaced relation in a second plane substantially parallel to the first plane, and a reflector supported in a third plane intermediate and substantially parallel to said first and second planes and having a dimension parallel to said length which is greater than said length. The antenna system also includes a second antenna array, having a radiation pattern in the general shape of a figure eight with an axis perpendicular to the first-mentioned axis, including a pair of dipole radiators having the aforesaid length and supported in spaced relation in effectively the aforesaid third plane and positioned above the aforesaid directive array. The antenna system further includes a rotatable support coupled to the antenna arrays for rotating the radiation patterns.

Further details of the invention will be evident from the following description of one form of the invention.

Referring to the drawings: Fig. 1 shows the field patterns for the antennas in question;

Description of antenna system

Figure 1:
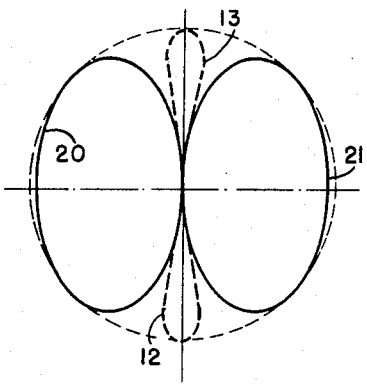
Figure 2:
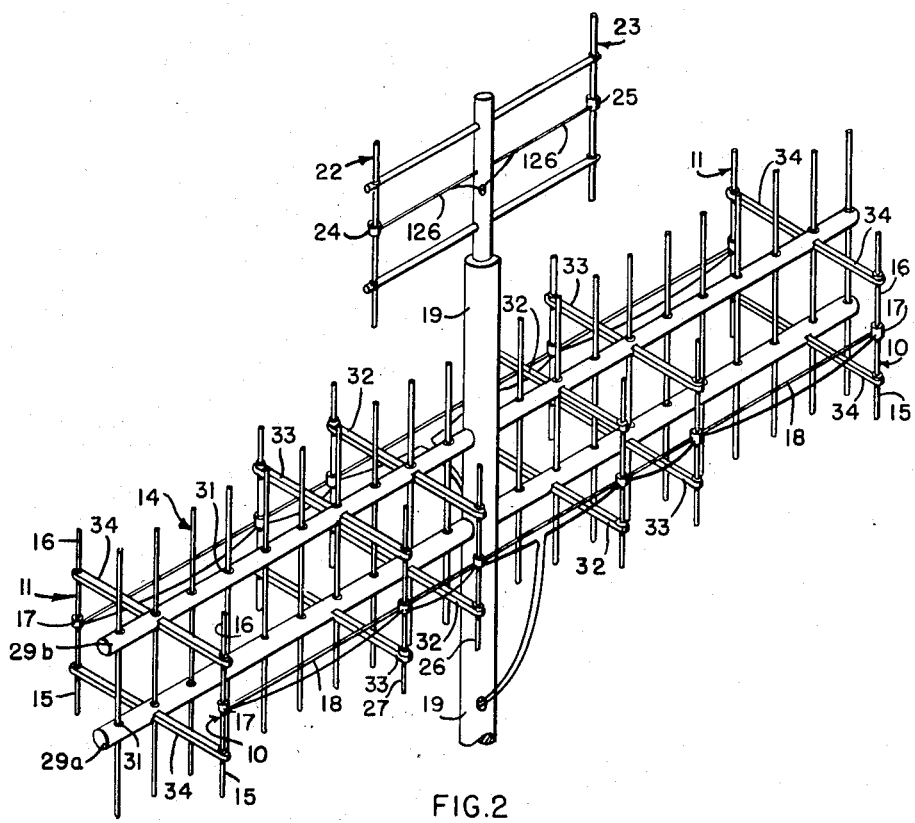
Fig. 2 shows in perpsective drawing all of the antenna system.

The antenna system according to Fig. 2 is thus formed from three different antennas as well as one shielding network. Two of these antennas 10 and 11, respectively, are for the purpose of creating field characteristics or patterns of so-called cigar-like form. The corresponding field characteristics are indicated in Fig. 1 by 12 and 13, respectively. These field characteristics are normally provided with some side lobes, but said side lobes in the arrangement according to the present invention may be kept at a very low field intensity so that they do not greatly disturb the normal transmission. Since the fields from said side lobes are radiated in directions which are covered by the covering field, they have not been shown in Fig. 1.

In order that the antenna 10 shall only transmit a field according to the field pattern 12 and the antenna 11 only transmit a field pattern according to the diagram 13, there is provided between the two antennas 10 and 11 a shielding network or screen 14. This shielding network should be grounded.

Each dipole antenna in the antenna set 10 or 11 consists of two bars, for instance the bars 15 and 16, which are mutually insulated and connected with a coupling head 17, which has the purpose partly to support the two bars of the dipole antenna, partly also to feed current to these bars. All of the coupling heads are, however, carried by parts, for instance the bar 18, of a framework of preferably insulating material. Dry wood, for instance oak wood, has proved fully sufficient for this purpose. The framework is carried by a vertical shaft 19, which is rotated in a given synchronous relation to the speech from a speaking machine or other suitable signal transmitter which is a source of the bearing statements. The source of bearing information is not a part of the present invention and may be of the type represented in applicants copending application Serial No. 329,521, filed January 5, 1953.

Between the two dipole antenna sets thus formed, there is placed the shielding network 14 which is also composed of a number of conductive bars. These bars are conductively connected together so that a continuous ground potential field level is created when the network is grounded.

In this way the two said sets of antennas 10 and 11 are effectively mutually screened so that one set of dipole antennas may radiate in one direction while the other one may radiate only in the other direction, as represented by means of the patterns 12 and 13 in Fig. 1.

Above the two dipole antennas 10 and 11 and the screen 14 therebetween, there is also a dipole antenna group creating the covering field. The directional pattern of the covering field is indicated by the lobes 20 and 21, respectively, in Fig. 1. This pattern thus consists in two broad flattened lobes, the outer parts of which together with the points of the lobes 12 and 13 suitably being formed in such a way, that they closely approach a circular line, as indicated by the dash line. This dipole antenna group consists of at least two dipole antennas 22 and 23, each of which being arranged in the same way as the dipole antennas of the groups 10 and 11. Accordingly the two antenna bars of each dipole are insulated from each other but are mechanically and electrically connected to proper ones of coupling heads 24 and 25. The antennas are carried by means of a member 126 of the framework, which is connected with the shaft 19, so that it rotates with this shaft.

In order that one shall create the most advantageous directional characteristics 12, 13, 20 and 21, the lengths of and the distances between the different antenna bars are of decisive importance. Although it has proved in practical tests that any good so-called broad-side antenna may be used for the antenna 10 or 11 and any good double pole dipole antenna for the antenna 22—23, it is advantageous in the construction to use the dimensions which have in practical tests, based upon empirical investigations proved, to give patterns which essentially coincide with those shown in Fig. 1. For explanation of these dimensions reference is made to Fig. 3.

In this figure all of the present dipole antenna bars, with but two exceptions, have been shown in the position which they have when the antennas are viewed from above. However, in order that the antenna bars 22 and 23 should not appear to overlap the bars contained in the antenna groups 10 and 11 and thus tend to confuse the reader, these have not been shown directly above but are displaced to the side of the last mentioned ones. The screen 14 is thus, in this form of the invention, composed of 21 bars arranged in a common plane and they extend in parallel directions with distances or spacings therebetween of substantially one-eighth of a wave length of the mean operation wave length of the system. It is suitable also to express other spacings or distances in eighths of that wavelength. The distance perpendicular to the plane of the screen 14 and to each of the planes of the antennas 10 and 11 is substantially two-eighths of that wave length. The antenna bars are symmetrically grouped about the shaft, which is indicated by the circular figure 19. In the part of the dipole antenna group 10, situated at the left in Fig. 3, the dipole antenna 26 is thus applied at a distance of substantially two-eighths of that wave length from the central or dividing vertical plane 28. At a distance of substantially one-quarter of that wave length from antenna 26 the dipole antenna 27 is positioned, and finally the dipole antenna 15, also shown in Fig. 2, is positioned at a distance of five-eighths of that wave length from the dipole antenna 27. All of the dipole bars in the antennas 10, 11 and 22—23 have the length of four-eighths of that wave length. All of the dipole antennas will therefore have a mechanical length of eight-eighths, or in other words, its mechanical total length will be substantially equal to one wave length.

The screen is made of bars of a length of twelve-eighths of that wave length. They are positioned in such a way, that they are supported at their middle or in any other suitable way so that they project equally above the upper ends of the dipole antenna bars as they descend below the lower ends thereof.

Figure 4:
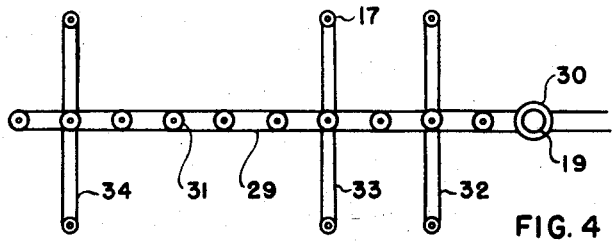
Fig. 4 shows a frame made of insulating material for carrying the antennas.

In order to keep the bars 15 and 16 of the dipoles 10 and 11 in their correct positions with required rigidness, particularly since the antenna system rotates a great number of turns and further is subjected to weather and wind, it is preferable to make this framework for the antenna groups 10 and 11 in the form of at least two additional carrier means or bars 29a and 29b placed at different heights, and suitably carried by the shaft 19. The bars 29a and 29b could for instance have a mutual distance of two-eighths of the wave length, but this distance is, of course, of no electrical importance. The upper left-hand half of such a carrier means has been shown in Fig. 4. The bars 29a and 29b may carry a number of clamping arrangements for the bars of the screen 14, indicated 31, and further a number of perpendicularly extending struts 32, 33, and 34 for carrying the bars of the dipole antenna groups 10 and 11.

The feeder lines to the antennas, which are made as co-axial cables, are carried through the interior of the shaft 19, which is made as a pipe shaft. They run out through suitable openings on said shaft and extend to the different coupling heads 17. This causes, however, no weakness in the arrangement, because the coupling heads (see Fig. 2) are carried by the bars 15, 16 of the dipole antennas, which are in their turn supported by the struts 32, 33 and 34.

Some attention should be given to the parts of the feeder lines, running from the shaft to the dipole antenna bars. One must remember, that it is a question of short wavelengths where the proper length of the conduit has an essential role. It is therefore important, that the voltage given to the different dipole antennas, which are directed in the same direction, is of the same phase position. For this purpose the feeder lines must be of equal length. If they are longer than the shortest path from one division point to the coupling head in question, the conductors may be carried into bows or windings. No danger of undesired couplings or other disturbances will be present if the conduits mentioned above are made in the form of coaxial conductors.

Figure 3:
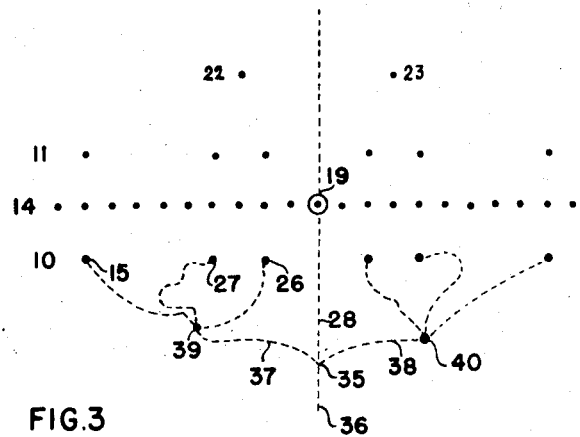
Fig. 3 is a plan position view of the present dipole antennas as seen from above, part of the feeder conductors being represented.

A suitable manner of running the feeder lines on is shown in dotted lines in Fig. 3. It is assumed that the point 35, where the conductor 36 from the transmitter is divided, is situated in a coupling box on the shaft 19 itself, although, in order to make the drawing more readable, it has been drawn at the side of this shaft. From the point 35 two conductors or conduits 37 and 38 emanate and each has a length of four-eighths of a wavelength. These two branch conduits 37 and 38 extend to the coupling points 39 and 40, respectively, where each of them is divided into three further branch conduits, which run to the respective coupling heads in the dipole antennas. The last mentioned branch conduits should have a length of six-eighths of a wave length.

Although it has been proved by empirical investigations, that a very advantageous form of the different present antenna characteristics is obtained, if the antennas are dimensioned in the way above described in detail, the invention is of course not limited to this constructive arrangement, but different modifications may be made within the spirit of the invention. It is not absolutely necessary for the execution of the invention that the antennas consist of dipole antennas, since it would also be possible to use any other kind of directional antennas known per se, giving a characteristic picture similar to that one stated in Fig. 1.

What is claimed is:

1. An antenna system for a talking radio beacon having a mean operating wave length comprising: a directive antenna array having a radiation pattern in the form of a pair of sharply concentrated beams extending in opposite directions and having a common axis, including a first plurality of dipole radiators having a length substantially equal to said wave length and supported in spaced relation in a first plane, a second plurality of dipole radiators having said length and supported in spaced relation in a second plane substantially parallel to said first plane, and a reflector supported in a third plane intermediate and substantially parallel to said first and second planes and having a dimension parallel to said length which is greater than said length; a second antenna array, having a radiation pattern in the general shape of a figure eight with an axis perpendicular to said first-mentioned axis, including a pair of dipole radiators having said length and supported in spaced relation in effectively said third plane and positioned above said directive array; and a rotatable support coupled to said antenna arrays for rotating said radiation patterns.

2. An antenna system for a talking radio beacon having a mean operating wave length $\lambda$ comprising: a directive antenna array having a radiation pattern in the form of a pair of sharply concentrated beams extending in opposite directions and having a common axis, including a first plurality of dipole radiators successive ones of which are supported in a first plane at spacings of $5\lambda/8$, $\lambda/4$, $\lambda/2$, $\lambda/4$, and $5\lambda/8$, a second plurality of dipole radiators successive ones of which are supported in a second plane substantially parallel to said first plane and at said spacings, and a reflector supported in a third plane, substantially parallel to, and $\lambda/4$ from said first and second planes, said radiators of said first plurality being symmetrically disposed with relation to said reflector and radiators of said second plurality; a second antenna array, having a radiation pattern in the general shape of a figure eight with an axis perpendicular to said first-mentioned axis, including a pair of dipole radiators supported in spaced relation in said third plane and positioned above said directive array; and a rotatable support coupled to said antenna arrays for rotating said radiation patterns.

3. An antenna system for a talking radio beacon having a mean operating wave length $\lambda$ comprising: a directive antenna array having a radiation pattern in the form of a pair of sharply concentrated beams extending in opposite directions and having a common axis, including a first plurality of dipole radiators successive ones of which are supported in a first plane at spacings of $5\lambda/8$, $\lambda/4$, $\lambda/2$, $\lambda/4$, and $5\lambda/8$, a second plurality of dipole radiators successive ones of which are supported in a second plane substantially parallel to said first plane and at said spacings, and a reflector supported in a third plane intermediate, substantially parallel to, and $\lambda/4$ from said first and second planes, said radiators of said first plurality being symmetrically disposed with relation to said reflector and radiators of said second plurality; a second antenna array, having a radiation pattern in the general shape of a figure eight with an axis perpendicular to said first-mentioned axis, including a pair of dipole radiators supported in spaced relation in said third plane and positioned above said directive array; a supply circuit coupled to said first plurality of radiators for supplying thereto energy of the same phase and having said wave length; a supply circuit coupled to said second plurality of radiators for supplying energy thereto having said wave length; and a rotatable support coupled to said antenna arrays for rotating said radiation patterns.

4. An antenna system for a talking radio beacon having a mean operating wave length $\lambda$ comprising: a directive antenna array having a radiation pattern in the form of a pair of sharply concentrated beams extending in opposite directions and having a common axis, including a first plurality of dipole radiators successive ones of which are supported in a first plane at spacings of $5\lambda/8$, $\lambda/4$, $\lambda/2$, $\lambda/4$, and $5\lambda/8$, a second plurality of dipole radiators successive ones of which are supported in a second plane substantially parallel to said first plane and at said spacings, and a reflector supported in a third plane intermediate, substantially parallel to, and $\lambda/4$ from said first and second planes, said radiators of said first plurality being symmetrically disposed with relation to said reflector and radiators of said second plurality; a second antenna array, having a radiation pattern in the general shape of a figure eight with an axis perpendicular to said first-mention axis, including a pair of dipole radiators supported in spaced relation in said third plane and positioned above said directive array; a supply circuit including transmission lines of equal length coupled to said first plurality of radiators for supplying thereto energy of the same phase and having said wave length; a supply circuit coupled to second plurality of radiators for supplying energy thereto having said wave length; and a rotatable support coupled to said antenna arrays for rotating said radiation patterns.

5. An antenna system for a talking radio beacon having a mean operating wave length $\lambda$ comprising: a directive antenna array having a radiation pattern in the form of a pair of sharply concentrated beams extending in opposite directions and having a common axis, including a first plurality of dipole radiators successive ones of which are supported in a first plane at spacings of $5\lambda/8$, $\lambda/4$, $\lambda/2$, $\lambda/4$, and $5\lambda/8$, a second plurality of dipole radiators successive ones of which are supported in a second plane substantially parallel to said first plane and at said spacings, and a reflector supported in a third plane intermediate, substantially parallel to, and $\lambda/4$ from said first and second planes, said radiators of said first plurality being symmetrically disposed with relation to said reflector and radiators of said second plurality; a second antenna array, having a radiation pattern in the general shape of a figure eight with an axis perpendicular to said first-mentioned axis, including a pair of dipole radiators supported in spaced relation in said third plane and positioned above said directive array; a supply circuit including transmission lines having lengths of $5\lambda/4$ coupled to said first plurality of radiators for supplying thereto energy of the same phase and having said wave length; a supply circuit coupled to said second plurality of radiators for supplying energy thereto having said wave length; and a rotatable support coupled to said antenna arrays for rotating said radiation patterns.

6. An antenna system for a talking radio beacon having a mean operating wave length $\lambda$ comprising: a directive antenna array having a radiation pattern in the form of a pair of sharply concentrated beams extending in opposite directions and having a common axis, including a first plurality of dipole radiators having a length substantially equal to said wave length and successive ones of which are supported in a first plane at spacings of $5\lambda/8$, $\lambda/4$, $\lambda/2$, $\lambda/4$, and $5\lambda/8$, a second plurality of dipole radiators having said length and successive ones of which are supported in a second plane substantially parallel to said first plane and at said spacings, and a plurality of spaced reflector elements each having a length of $3\lambda/2$ and supported in a third plane intermediate, substantially parallel to, and $\lambda/4$ from said first and second planes, said radiators of said first plurality being symmetrically disposed with relation to said reflector and radiators of said second plurality; a second antenna array, having a radiation pattern in the general shape of a figure eight with an axis perpendicular to said first-mentioned axis, including a pair of dipole radiators having said length and supported in spaced relation in said third plane and positioned above said directive array; and a rotatable support coupled to said antenna arrays for rotating said radiation patterns.

7. An antenna system for a talking radio beacon having a mean operating wave length $\lambda$ comprising: a directive antenna array having a radiation pattern in the form of a pair of sharply concentrated beams extending in opposite directions and having a common axis, including a first plurality of dipole radiators having a length substantially equal to said wave length and successive ones of which are supported in a first plane at spacings of $5\lambda/8$, $\lambda/4$, $\lambda/2$, $\lambda/4$, and $5\lambda/8$, a second plurality of dipole radiators having said length and successive ones of which are supported in a second plane substantially parallel to said first plane and at said spacings, and a plurality of reflector elements spaced $\lambda/8$ from each other and having a length of $3\lambda/2$ and supported in a third plane intermediate, substantially parallel to, and $\lambda/4$ from said first and second planes, said radiators of said first plurality being symmetrically disposed with relation to said reflector and radiators of said second plurality; a second antenna array, having a radiation pattern in the general shape of a figure eight with an axis perpendicular to said first-mentioned axis, including a pair of dipole radiators having said length and supported in spaced relation in said third plane and positioned above said directive array; and a rotatable support coupled to said antenna arrays for rotating said radiation patterns.

8. An antenna system for a talking radio beacon having a mean operating wave length $\lambda$ comprising: a directive antenna array having a radiation pattern in the form of a pair of sharply concentrated beams extending in opposite directions and having a common axis, including a first plurality of dipole radiators having a length substantially equal to said wave length and successive ones of which are supported in a first plane at spacings of $5\lambda/8$, $\lambda/4$, $\lambda/2$, $\lambda/4$, and $5\lambda/8$, a second plurality of dipole radiators having said length and successive ones of which are supported in a second plane substantially parallel to said first plane and at said spacings, and a plurality of reflector elements spaced $\lambda/8$ from each other and having a length of $3\lambda/2$ and supported in a third plane intermediate, substantially parallel to, and $\lambda/4$ from said first and second planes, said radiators of said first plurality being symmetrically disposed with relation to said reflector and radiators of said second plurality; a second antenna array, having a radiation pattern in the general shape of a figure eight with an axis perpendicular to said first-mentioned axis, including a pair of dipole radiators having said length and supported in spaced relation in said third plane and positioned above said directive array; a supply circuit including transmission lines of equal length coupled to said first plurality of radiators for supplying thereto energy of the same phase and having said wave length; a supply circuit coupled to said second plurality of radiators for supplying energy thereto having said wave length and a rotatable support coupled to said antenna arrays for rotating said radiation patterns.

References Cited in the file of this patent

UNITED STATES PATENTS

| | | |
|---|---|---|
| 1,764,441 | Hahnemann | June 17, 1930 |
| 1,898,058 | Lindenblad | Feb. 21, 1933 |
| 2,183,784 | Carter | Dec. 19, 1939 |
| 2,272,312 | Tunick | Feb. 10, 1942 |
| 2,485,138 | Carter | Oct. 18, 1949 |
| 2,551,586 | Dobler et al. | May 8, 1951 |
| 2,580,462 | Ranger | Jan. 1, 1952 |